(12) United States Patent
Kesavan et al.

(10) Patent No.: US 12,531,730 B2
(45) Date of Patent: Jan. 20, 2026

(54) TREE-BASED KEY STORAGE FOR SELECTIVELY GRANTING ACCESS TO AN ENCRYPTED CONVERSATION HISTORY

(71) Applicant: Zoom Video Communications, Inc., San Jose, CA (US)

(72) Inventors: Balachandar Ganesh Kesavan, New York, NY (US); Antonio Marcedone, New York, NY (US)

(73) Assignee: Zoom Communications, Inc., San Jose, CA (US)

( * ) Notice: Subject to any disclaimer, the term of this patent is extended or adjusted under 35 U.S.C. 154(b) by 223 days.

(21) Appl. No.: 18/360,199

(22) Filed: Jul. 27, 2023

(65) Prior Publication Data
US 2024/0275590 A1    Aug. 15, 2024

Related U.S. Application Data

(60) Provisional application No. 63/445,910, filed on Feb. 15, 2023.

(51) Int. Cl.
H04L 9/08         (2006.01)
(52) U.S. Cl.
CPC .................... H04L 9/088 (2013.01)
(58) Field of Classification Search
CPC ................ H04L 9/088; G04L 9/088
See application file for complete search history.

(56) References Cited

U.S. PATENT DOCUMENTS

| | | | |
|---|---|---|---|
| 7,451,310 B2 * | 11/2008 | Hall | H04L 9/3215 713/161 |
| 9,215,076 B1 * | 12/2015 | Roth | H04L 9/3247 |
| 10,341,304 B1 | 7/2019 | Boutros et al. | |
| 10,783,269 B1 | 9/2020 | Shraer et al. | |
| 10,963,593 B1 | 3/2021 | Campagna et al. | |
| 2004/0223608 A1 * | 11/2004 | Oommen | H04L 9/0656 380/28 |
| 2007/0133806 A1 * | 6/2007 | Asano | H04L 9/0891 380/277 |

(Continued)

OTHER PUBLICATIONS

EP International Search Report and Written Opinion for PCT/US2024/015331 mailed Jun. 11, 2024.

(Continued)

*Primary Examiner* — Phy Anh T Vu
(74) *Attorney, Agent, or Firm* — Kilpatrick Townsend & Stockton, LLP

(57) ABSTRACT

Tree-based key storage can be used to selectively grant access to an encrypted conversation history. For example, a system can access a ciphertext tree that includes an internal node with a set of child nodes. The internal node can correspond to a key and a ciphertext. The ciphertext can be generated by encrypting a set of child keys, corresponding to the set of child nodes, using the key. The set of child keys may have been used to encrypt messages associated with a conversation. The system can then provide the ciphertext to a client device. The client device can receive the key from a source, decrypt the ciphertext using the key to derive the set of child keys corresponding to the set of child nodes, and decrypt at least some of the encrypted messages using at least one key of the set of child keys.

18 Claims, 9 Drawing Sheets

(56) References Cited

U.S. PATENT DOCUMENTS

| | | | |
|---|---|---|---|
| 2009/0080658 A1* | 3/2009 | Waters | G06F 21/6218 |
| | | | 380/277 |
| 2017/0118183 A1 | 4/2017 | Shin et al. | |
| 2020/0125563 A1* | 4/2020 | Fan | H04L 9/0894 |
| 2022/0376895 A1 | 11/2022 | Booth et al. | |
| 2023/0353383 A1* | 11/2023 | van Vredendaal | H04L 9/3247 |

OTHER PUBLICATIONS

EP International Search Report and Written Opinion for PCT/US2024/015328 mailed Jun. 14, 2024.

* cited by examiner

US 12,531,730 B2

TREE-BASED KEY STORAGE FOR SELECTIVELY GRANTING ACCESS TO AN ENCRYPTED CONVERSATION HISTORY

CROSS-REFERENCE TO RELATED APPLICATION

This application claims priority to U.S. Provisional Application No. 63/445,910 filed Feb. 15, 2023 and titled "COMPACT KEY STORAGE," the entirety of which is hereby incorporated by reference herein.

TECHNICAL FIELD

The present application generally relates to chat messaging and, more particularly, relates to using tree-based key storage to selectively grant access to an encrypted conversation history.

BRIEF DESCRIPTION OF THE DRAWINGS

The accompanying drawings, which are incorporated into and constitute a part of this specification, illustrate one or more certain examples and, together with the description of the examples, serve to explain the principles and implementations of the certain examples.

DETAILED DESCRIPTION

Figure 1:
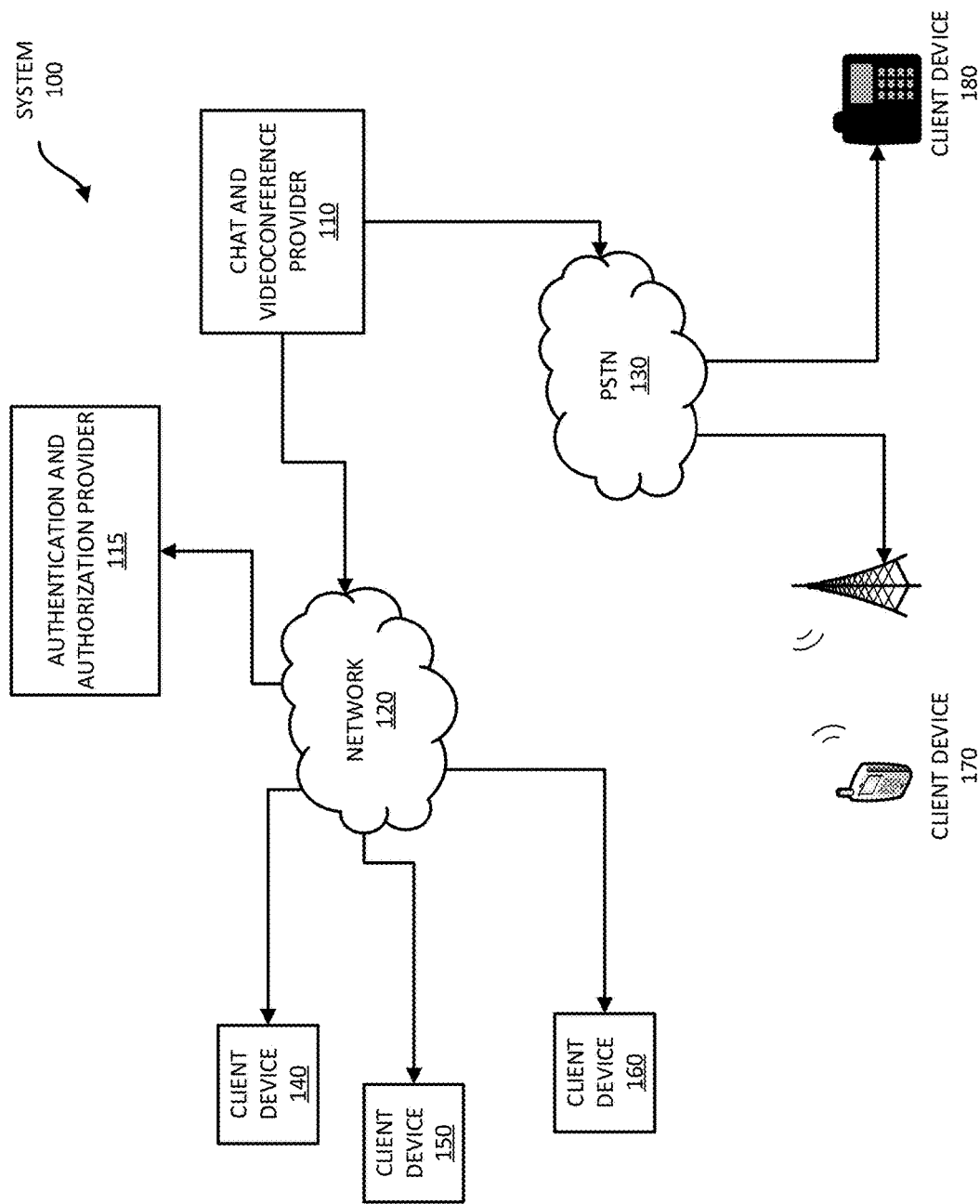
FIG. 1 shows an example of a system for providing videoconferencing and chat functionality to various client devices according to some aspects of the present disclosure.

Examples are described herein in the context of tree-based key storage for selectively granting access to an encrypted conversation history. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

One common way in which people converse over the Internet is through text chats. To engage in a text chat conversation, the participants can execute chat client software on their client devices. The chat client software may be a specialized chat-client application, a website browser, or any other suitable software for facilitating the chat conversation. The chat client software can generate chat interfaces through which the users can submit their messages (e.g., text chat messages) and view messages sent by other participants in the chat conversation. While in some situations these text chats may occur directly via peer-to-peer connections, in most cases these text chats are facilitated by chat service providers. For example, users may chat with one another using Zoom Chat by Zoom Video Communications® ("Zoom"). Zoom Chat is a cloud-based chat service that allows the participants to engage in text chats with one another. Such chat service providers can employ one or more chat servers to facilitate the conversation.

In some cases, a conversation may include sensitive information, such as personal or confidential information. In those situations, it may be desirable to encrypt some or all of the messages in the conversation. To implement this encryption, a client device participating in the conversation can generate an encryption key, such as a symmetric key. For example, a host device associated with a host of the conversation may generate the encryption key. The client device can then transmit the encryption key to the other client devices participating in the conversation, so that they can encrypt and decrypt messages in the conversation. Thus, although referred to herein as an "encryption key", the same key may also be used for decryption in some cases. Over the course of the conversation, the client device may change the encryption key one or more times in response to various events. For example, the client device may automatically rotate the encryption key at some predefined time interval, such as every five minutes. As another example, the client device may automatically rotate the key when a participant leaves the conversation, so that the participant cannot access subsequent messages. Each time the client device generates a new key, the client device can transmit the new key to the other client devices still participating in the conversation, so that they can continue to encrypt and decrypt subsequent messages in the conversation.

There may be certain situations where it is desirable to selectively allow a specific user to view some or all of the conversation history. The specific user may not have participated in the conversation (so far) but, nevertheless, may want to access some or all of the conversation history. But because different parts of the conversation history may be encrypted using different keys, it may be challenging to easily grant that user access to the conversation history.

Some examples of the present disclosure can overcome one or more of the abovementioned problems by providing a quick and easy way to selectively grant a target user access to some or all of an encrypted conversation history. For example, a system can generate a ciphertext tree based on the encryption keys used to encrypt the messages in the conversation. The system can construct the ciphertext tree over the course of the conversation. For example, each time the client device generates a new encryption key, the system can update the ciphertext tree to add the new key. The ciphertext tree can include leaf nodes and internal nodes. The leaf nodes can correspond to the encryption keys used to generate the encrypted messages in the conversation. The internal nodes can each have a derived key and a ciphertext. A derived key can be a key that is derived from two or more subkeys. For instance, the derived key for an internal node can be generated by hashing two or more child keys of two or more child nodes of that internal node. And the ciphertext for the internal node can be generated by encrypting the child keys of the child nodes using the derived key. Once generated, the ciphertext tree can then be used to selectively grant a target user access to some or all of the encrypted messages in the conversation.

For example, a client device can select a particular key to provide to a target device of a target user. The selected key may be a derived key corresponding to an internal node of the ciphertext tree, or the selected key may be an encryption key corresponding to one of the leaf nodes in the ciphertext tree. The target user can be granted more or less access to the encrypted messages by selecting a key that is higher up the ciphertext tree (e.g., a key that corresponds to the root node of the ciphertext tree) or lower down the ciphertext tree (e.g., an encryption key that corresponds to a leaf node), respectively. In this way, a particular level of access can be selectively granted to the target user by providing the target user with the appropriate key. After selecting a key, the client device can transmit the selected key to the target device.

The target device can receive the selected key from the client device, obtain at least a portion of the ciphertext tree from the system, and then decrypt that portion of the ciphertext tree using the selected key. For example, the target device can begin by identifying a starting node in the ciphertext tree corresponding to the selected key. The starting node can correspond to a beginning of a pathway through the ciphertext tree to a leaf node. Starting from the starting node, the target device then sequentially decrypts each respective ciphertext associated with each respective internal node along the pathway using that node's respective key to derive a child key, where the child key may be used to decrypt the next ciphertext of the next internal node along the pathway, until a leaf node is reached. Through this iterative process, the target device can obtain access to the encryption keys at one or more leaf nodes in the ciphertext tree. Having obtained the encryption keys, the target device can then decrypt some or all of the encrypted messages in the conversation that were encrypted using those encryption keys.

Using the above techniques, the client device may only need to transmit a single communication with a single key (e.g., the selected key) to the target device to allow the target user's client device to decrypt a selected subset of the conversation history. This may reduce the amount of processing power, bandwidth, and memory consumed by the client device in selectively granting access to the target user to view a limited portion of the encrypted conversation.

This illustrative example is given to introduce the reader to the general subject matter discussed herein and the disclosure is not limited to this example. The following sections describe various additional non-limiting examples.

Referring now to FIG. 1, FIG. 1 shows an example of a system 100 that provides videoconferencing functionality to various client devices. The system 100 includes a chat and videoconference provider 110 that is connected to multiple communication networks 120, 130, through which various client devices 140-180 can participate in videoconferences hosted by the chat and videoconference provider 110. For example, the chat and videoconference provider 110 can be located within a private network to provide video conferencing services to devices within the private network, or it can be connected to a public network, e.g., the internet, so it may be accessed by anyone. Some examples may even provide a hybrid model in which a chat and videoconference provider 110 may supply components to enable a private organization to host private internal videoconferences or to connect its system to the chat and videoconference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and videoconference provider 110 and manage user authorization for the various services provided by chat and videoconference provider 110. In this example, the authentication and authorization provider 115 is operated by a different entity than the chat and videoconference provider 110, though in some examples, they may be the same entity.

Figure 2:
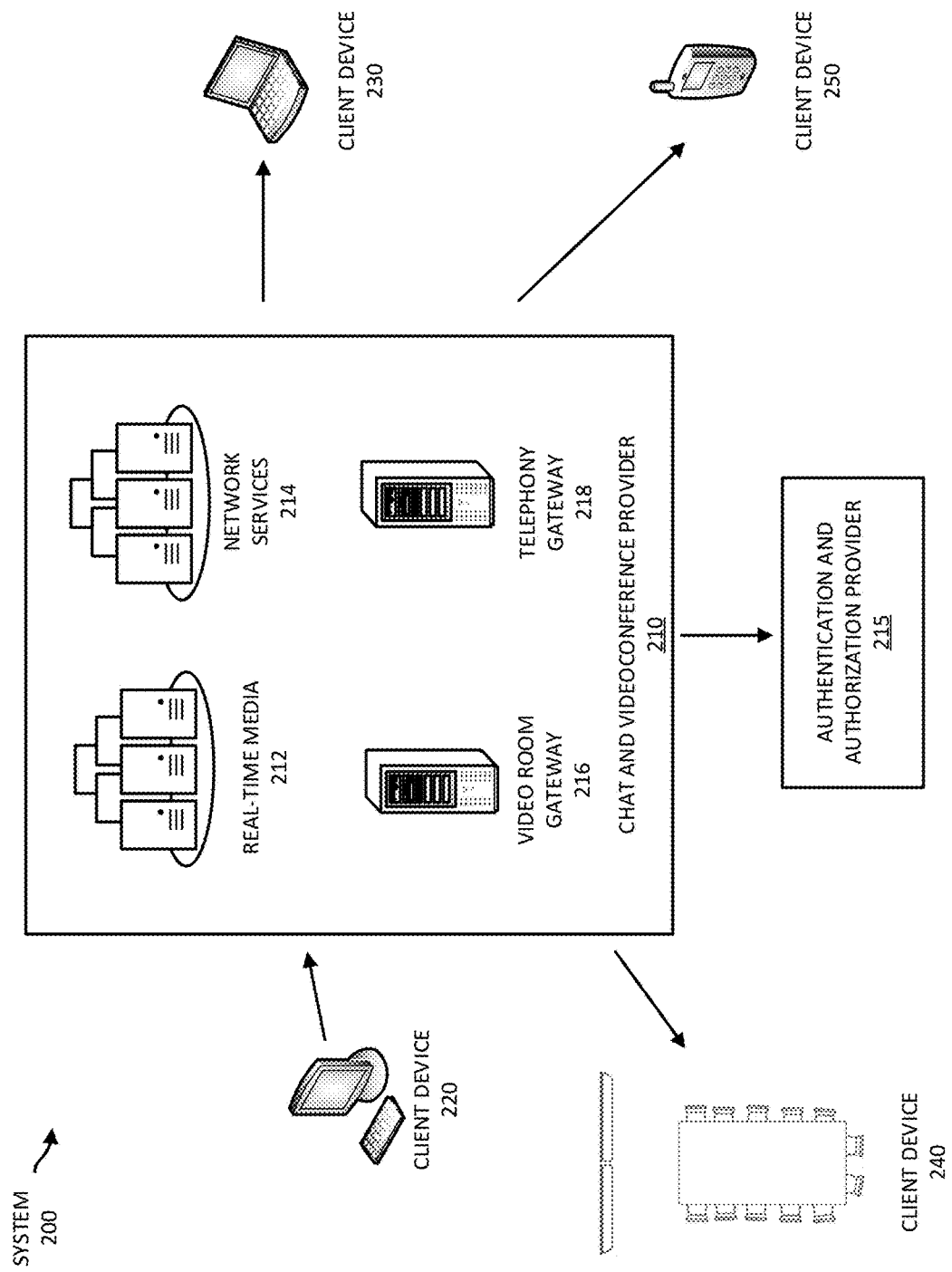
FIG. 2 shows another example of a system for providing videoconferencing and chat functionality to various client devices according to some aspects of the present disclosure.

Chat and videoconference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and videoconference provider 110. It should be understood that the term "meeting" encompasses the term "webinar" used herein.

Meetings in this example chat and videoconference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and videoconference provider 110, a user may contact the chat and videoconference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and videoconference provider 110 may prompt the user for certain information, such as a date, time, and duration for the meeting, a number of participants, a type of encryption to use, whether the meeting is confidential or open to the public, etc. After receiving the various meeting settings, the chat and videoconference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The videoconference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and videoconference provider 110. They also receive audio or video information from the chat and videoconference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and videoconference provider 110 may also invalidate the meeting information, such as the meeting identifier or password/passcode.

To provide such functionality, one or more client devices 140-180 may communicate with the chat and videoconference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and videoconference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a videoconference meeting hosted by the chat and videoconference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and videoconference provider 110. It should be appreciated that certain computing devices may also provide telephony functionality and may operate as telephony devices. For example, smartphones typically provide cellular telephone capabilities and thus may operate as telephony devices in the system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, the client devices 140-160 contact the chat and videoconference provider 110 using network 120 and may provide information to the chat and videoconference provider 110 to access functionality provided by the chat and videoconference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and videoconference provider 110.

An authentication and authorization provider 115 may be any entity trusted by the chat and videoconference provider 110 that can help authenticate a user to the chat and videoconference provider 110 and authorize the user to access the services provided by the chat and videoconference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and videoconference provider 110. The authentication and authorization provider 115 may require the explicit consent of the user before allowing the chat and videoconference provider 110 to access the user's account information for authentication and authorization purposes.

Once the user is authenticated, the authentication and authorization provider 115 may provide the chat and videoconference provider 110 with information about services the user is authorized to access. For instance, the authentication and authorization provider 115 may store information about user roles associated with the user. The user roles may include collections of services provided by the chat and videoconference provider 110 that users assigned to those user roles are authorized to use. Alternatively, more or less granular approaches to user authorization may be used.

When the user accesses the chat and videoconference provider 110 using a client device, the chat and videoconference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and videoconference provider 110 either provides or denies access to its services, respectively.

For telephony devices, e.g., client devices 170-180, the user may place a telephone call to the chat and videoconference provider 110 to access videoconference services. After the call is answered, the user may provide information regarding a videoconference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and videoconference provider 110. For example, telephony devices may be unable to provide authentication information to authenticate the telephony device or the user to the chat and videoconference provider 110. Thus, the chat and videoconference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and videoconference provider 110, even in cases where the user could authenticate and employs a client device capable of authenticating the user to the chat and videoconference provider 110. The chat and videoconference provider 110 may determine whether to allow such anonymous users to use services provided by the chat and videoconference provider 110. Anonymous users, regardless of the reason for anonymity, may be restricted as discussed above with respect to users employing telephony devices, and in some cases may be prevented from accessing certain meetings or other services, or may be entirely prevented from accessing the chat and videoconference provider 110.

Referring again to chat and videoconference provider 110, in some examples, it may allow client devices 140-160 to encrypt their respective video and audio streams to help improve privacy in their meetings. Encryption may be provided between the client devices 140-160 and the chat and videoconference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and videoconference provider 110, while allowing the chat and videoconference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and videoconference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and videoconference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a chat and videoconference provider 210 provides videoconferencing functionality to various client devices 220-250. The client devices 220-250 include two conventional computing devices 220-230, dedicated equipment for a videoconference room 240, and a telephony device 250. Each client device 220-250 communicates with the chat and videoconference provider 210 over a communications network, such as the internet for client devices 220-240 or the PSTN for client device 250, generally as described above with respect to FIG. 1. The chat and videoconference provider 210 is also in communication with one or more authentication and authorization providers 215, which can authenticate various users to the chat and videoconference provider 210 generally as described above with respect to FIG. 1.

In this example, the chat and videoconference provider 210 employs multiple different servers (or groups of servers) to provide different examples of videoconference functionality, thereby enabling the various client devices to create and participate in videoconference meetings. The chat and videoconference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more videoconference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and videoconference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and videoconference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and videoconference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and videoconference provider 210 may allow a meeting participant to notify it of inappropriate behavior or content in a meeting. Such a notification may trigger the real-time media servers to 212 record a portion of the meeting for review by the chat and videoconference provider 210. Still other functionality may be implemented to take actions based on the decrypted multimedia streams at the chat and videoconference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and videoconference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the videoconference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and videoconference provider under a supervisory set of servers. When a client device 220-250 accesses the chat and videoconference provider 210, it will typically communicate with one or more network services servers 214 to access their account or to participate in a meeting.

When a client device 220-250 first contacts the chat and videoconference provider 210 in this example, it is routed to a network services server 214. The client device may then provide access credentials for a user, e.g., a username and password or single sign-on credentials, to gain authenticated access to the chat and videoconference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and videoconference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and videoconference provider 210 anonymously. When communicating anonymously, a client device 220-250 may communicate with one or more network services servers 214 but only provide information to create or join a meeting, depending on what features the chat and videoconference provider allows for anonymous users. For example, an anonymous user may access the chat and videoconference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and videoconference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and videoconference provider 210. For example, the video conferencing hardware may be provided by the chat and videoconference provider to one or more of its subscribers, which may provide access credentials to the video conferencing hardware to use to connect to the chat and videoconference provider 210.

The video room gateway servers 216 provide specialized authentication and communication with the dedicated video conferencing hardware that may not be available to other client devices 220-230, 250. For example, the video conferencing hardware may register with the chat and videoconference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and videoconference provider 210.

Referring now to the telephony gateway servers 218, these servers 218 enable and facilitate telephony devices' participation in meetings hosted by the chat and videoconference provider 210. Because telephony devices communicate using the PSTN and not using computer networking protocols, such as TCP/IP, the telephony gateway servers 218 act as an interface that converts between the PSTN, and the networking system used by the chat and videoconference provider 210.

For example, if a user uses a telephony device to connect to a meeting, they may dial a phone number corresponding to one of the chat and videoconference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multifrequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and videoconference provider 210 discussed above are merely examples of such devices and an example architecture. Some videoconference providers may provide more or less functionality than described above and may not separate functionality into different types of servers as discussed above. Instead, any suitable servers and network architectures may be used according to different examples.

Figure 3:
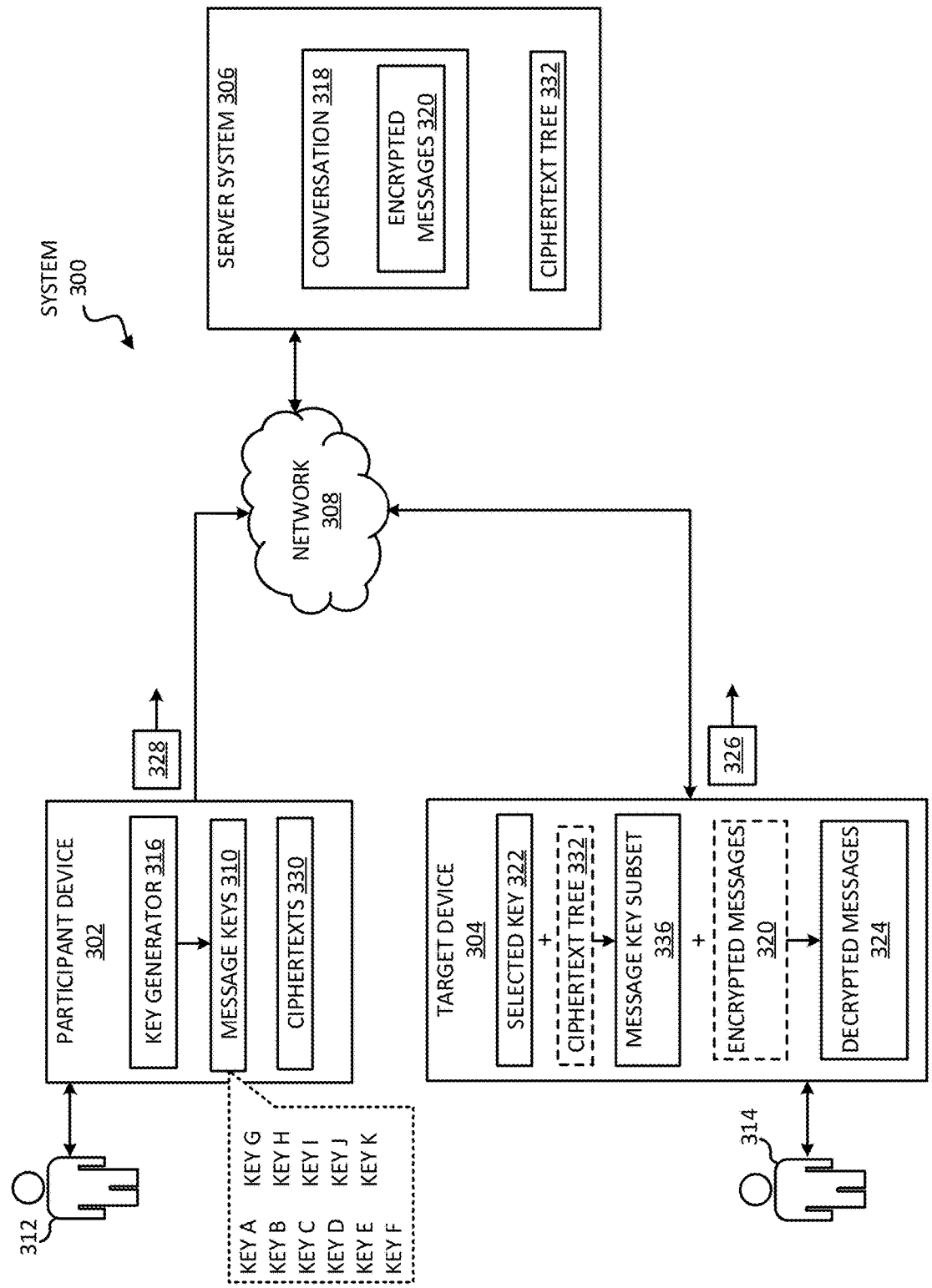
FIG. 3 shows an example of a system for granting selective access to an encrypted conversation history according to some aspects of the present disclosure.

Turning now to FIG. 3, shown is an example of a system 300 for using tree-based key storage for selectively granting access to an encrypted conversation history according to some aspects of the present disclosure. The system 300 includes a participant device 302 (e.g., any of the client devices described above) associated with a participant 312 of a conversation 318, such as a text chat conversation. In some examples, the participant device 302 is a host device associated with a host of the conversation 318. Multiple participant devices may participate in the conversation 318. The participant devices can each execute chat client software to engage in the conversation 318 via one or more networks 308, such as the Internet.

The conversation 318 may be facilitated by a server system 306. For example, the server system 306 can route messages back-and-forth between the participant devices via the one or more networks 308, store a conversation history (e.g., encrypted messages 320) associated with the conversation 318, and perform other functions. The server system 306 may be operated by a chat and videoconference provider, such as any of the chat and videoconference providers 110, 210 described above. The server system 306 can include one or more servers.

In some examples, the conversation 318 may be an encrypted conversation involving encrypted messages 320. The messages may be encrypted using encryption keys generated by the participant device 302. For example, the participant device 302 can include a key generator 316. The key generator 316 can software, hardware, or a combination thereof. The participant device 302 can use the key generator 316 to generate any number of message keys 310 (e.g., encryption keys for encrypting/decrypting messages) over the course of the conversation 318. For example, the participant device 302 can use the key generator 316 to generate a new message key each time the participant device 302 detects one or more events, such as the passage of a predefined time interval or a change in the participants in the conversation 318. In the example shown in FIG. 3, the participant device 302 has generated eleven message keys so far over the course of the conversation 318, with Message Key A being the oldest and Message Key K being the newest. But in other examples, the participant device 302 may generate more or fewer keys 310. Other participant devices may also generate message keys and perform the techniques described herein, for example to incrementally construct the ciphertext tree 332 described below.

Each of the message keys 310 can be used to encrypt and decrypt messages between the conversation participants during a corresponding time interval for which the key is active. For example, each time a new key is generated, the participant device 302 can transmit the new key to the other participant devices for use in encrypting/decrypting subsequent messages. This can facilitate end-to-end encryption of the conversation 318. Because different message keys 310 are only active (e.g., designated for encrypting/decrypting messages) for their respective time periods, a key that is active during one time period cannot be used to successfully decrypt messages from another time period.

In some examples, the system 300 can generate a ciphertext tree 332 based on the message keys 310. For instance, the participant device 302 can generate ciphertexts 330 based on the message keys 310. The participant device 302 can then provide the ciphertexts 330 to the server system 306, which can generate the ciphertext tree 332 based on the ciphertexts 330. Alternatively, the participant device 302 can generate some or all of the ciphertext tree 332 based on the ciphertexts 330. The participant device 302 can then provide the ciphertext tree 332 to the server system 306. Either way, the system 300 can construct the ciphertext tree 332 to assist in granting a target user 314 with access to some or all of the conversation history.

Figure 4:
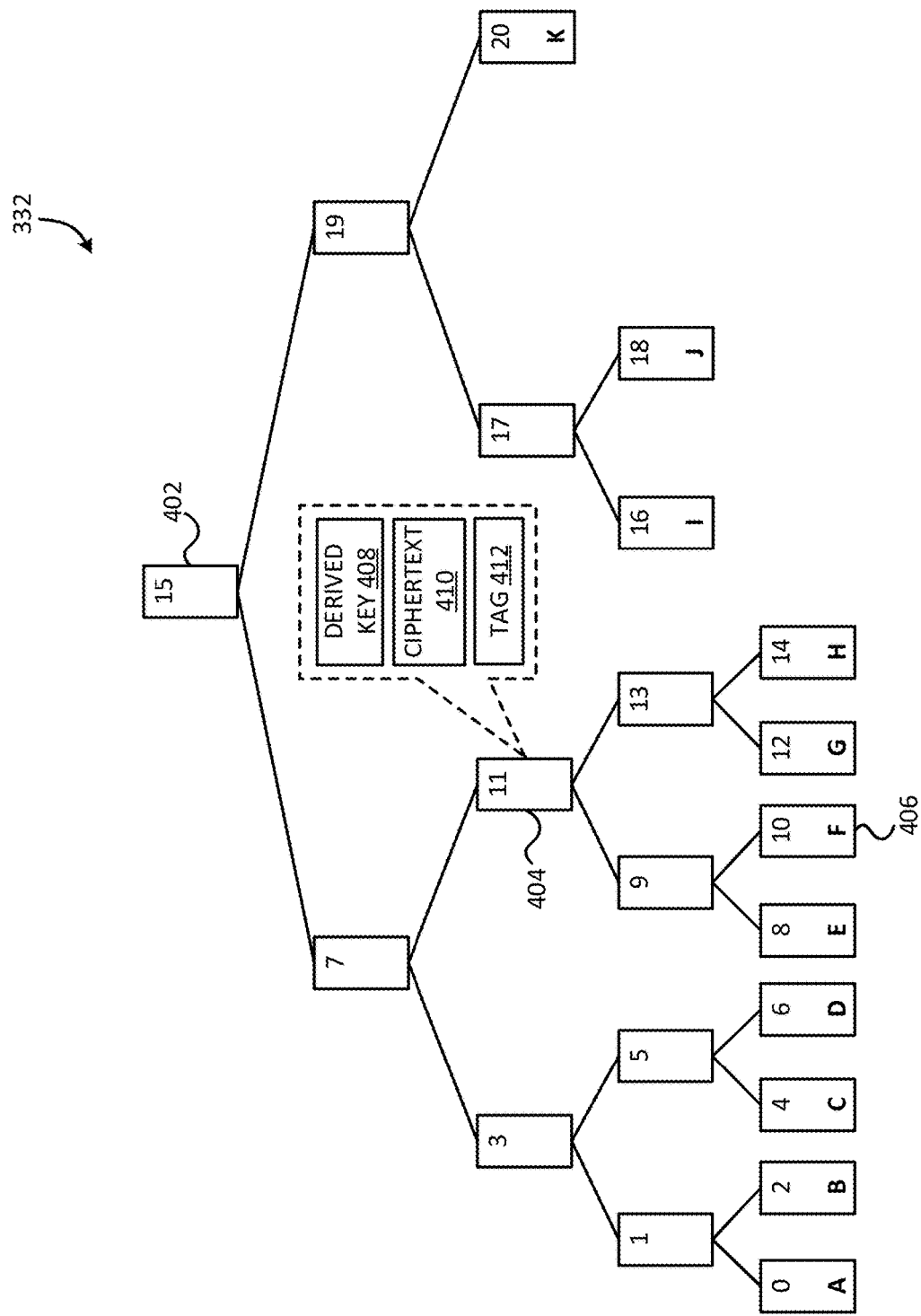
FIG. 4 shows an example of a ciphertext tree according to some aspects of the present disclosure.

The ciphertext tree 332 can be a tree-like data structure, such as a binary tree in which every node has no more than two child nodes. In some examples, the tree-like data structure can be a left-balanced binary tree in which a new leaf is added to the right-most spot. One example of the ciphertext tree 332 is shown in FIG. 4. As shown in FIG. 4, the ciphertext tree 332 can include a root node 402, internal nodes such as internal node 404, and leaf nodes such as leaf node 406. The root node 402 can be considered a type of internal node.

The nodes in the ciphertext tree 332 have a parent-child relationship, where nodes that are higher in the ciphertext tree 332 can be considered parents of nodes that are lower in the ciphertext tree 332, and where nodes lower in the ciphertext tree 332 can be considered children of nodes that are higher in the ciphertext tree 332. Those relationships are represented in FIG. 4 by lines connecting the nodes. For example, node 17 can be considered a direct parent of nodes 16 and 18. Conversely, nodes 16 and 18 can be considered direct children of node 17. There can also be indirect parent/child relationships. For example, node 7 can be an indirect parent of node 9, and node 14 can be an indirect child of node 11.

In the ciphertext tree 332, the leaf nodes can be associated with the message keys 310 that were generated by the participant device 302 for use in encrypting the messages in the conversation 318. In particular, each leaf node can be associated with one of the message keys 310. Those message keys 310 are designated in FIG. 4 using letters A-K to represent Message Keys A-K.

Some internal nodes in the ciphertext tree 332 can be considered complete and others can be considered incomplete. A complete internal node is an internal node for which its left number of children is equal to its right number of children. One example of a complete internal node is node 11, which has three child nodes on the left (nodes 8, 9, and 10) and three child nodes on the right (nodes 12, 13, and 14). An incomplete internal node is an internal node for which its left number of children does not equal to its right number of children. One example of an incomplete internal node is node 19, because it has three child nodes on the left (nodes 16, 17, and 18) but only one child node on the right (node 20).

Each complete internal node can be associated with a derived key. For example, node 11 is a complete internal node that is associated with a derived key 408. The derived key 408 for the internal node 404 can be generated based on its child keys. A child key is a key associated with a child node of an internal node. For example, the derived key 408 for the internal node 404 can be generated by hashing the key of node 9 and the key of node 13. The key of node 9, in turn, may be generated by hashing the message key of node 8 and the message key of node 10. And the key of node 13 may be generated by hashing the message key of node 12 and the message key of node 14. A similar process can be applied to the other internal nodes of the ciphertext tree 332. Incomplete internal nodes may not have corresponding derived keys.

Each complete internal node can also be associated with a ciphertext. For example, node 11 is associated with a ciphertext 410. The ciphertext 410 can be generated by encrypting the child keys using the derived key 408. For example, the ciphertext 410 for the internal node 404 can be generated by encrypting the key of node 9 and the key of node 13 using the derived key 408. A similar process can be applied to the other complete internal nodes of the ciphertext tree 332. Incomplete internal nodes may not have corresponding ciphertexts.

Each complete internal node can further be associated with a tag. For example, node 11 is associated with a tag 412. A tag can be authentication data usable to validate the ciphertext 410. In some examples, the tag 412 can be generated by hashing the ciphertext 410 with the tags of the child nodes (e.g., the direct child nodes). For example, the tag 412 can be generated by hashing the ciphertext 410 with tag_I, and tag_R, where tag_I, is the tag corresponding to node 9 and tag_R is the tag corresponding to node 13. When the child nodes are leaf nodes, predefined default values can be used for the child tags. For example, if the internal node is node 9, its child nodes are leaf nodes 8 and 10. In this situation, to compute a tag for node 9, a first default value can be used for tag_I, and a second default value can be used for tag_R, where the two default values may be the same as or different from one another.

Because the leaf nodes have no children, they will not have any corresponding ciphertexts. If additional message keys are generated by the participant device 302 and/or other participant devices, additional leaf nodes and/or intermediate nodes can be added to the ciphertext tree 332, where the additional leaf nodes can correspond to the additional keys.

Referring back to FIG. 3, in some situations, the participant 312 may wish to grant a target user 314 access to some or all of the conversation 318 (e.g., its encrypted messages 320). The target user 314 may be a new participant in the conversation 318 who wishes to access some or all of the prior conversation history, which occurred before they joined the conversation 318. Alternatively, the target user 314 may not be a participant in the conversation 318 but may still wish to access some or all of the conversation history for various reasons. Either way, the participant 312 can selectively grant the target user 314 access to some or all of the conversation history by providing a selected key 322 (e.g., a derived key), or a group of selected keys, to the target user 314. The participant 312 may also provide the tags corresponding to each of the selected keys to the target user 314.

For example, the target user 314 can operate a target device 304, which may be any suitable type of client device. The target device 304 can transmit a request 326 to the participant device 302 to access some or all of the conversation history. In reply to the request 326, the participant device 302 can transmit a response 328 to the target device 304, where the response 328 includes one or more selected keys 322 and the corresponding tags. Alternatively, the participant device 302 can transmit the one or more selected keys 322 and the corresponding tags to the target device 304 for other reasons, other than in response to a request 326 from the target device 304. Either way, the participant device 302 may not need to transmit any other keys to the target device 304, because the target device 304 can derive the other keys to which it has been granted access using the ciphertext tree 332, as explained below.

Each of the one or more selected keys 322 can correspond to one of the internal nodes or leaf nodes of the ciphertext tree 332. The participant 312 can grant the target user 314 more or less access to the conversation history depending on which key or keys are provided to the target user 314. For instance, the participant 312 can grant the target user 314 access to more of the encrypted messages in the conversation history by providing the target user 314 with a key that is higher up the ciphertext tree 332 (e.g., the derived key associated with node 7 in FIG. 4) or a greater number of keys. Conversely, the participant 312 can grant the target user 314 access to less of the encrypted messages in the conversation history by providing the target user 314 with a key that is lower down the ciphertext tree 332 (e.g., the derived key associated with node 9 in FIG. 4) or with a fewer number of keys. In this way, the participant 312 can selectively grant a particular level of access to the target user 314 by providing them with the appropriate key or set of keys.

The target device 304 can receive the selected key(s) 322 from the participant device 302 or another source. The target device 304 can also receive some or all of the encrypted messages 320 the server system 306 or another source. The target device 304 can further receive some or all of the ciphertext tree 332 from the server system 306. The target device 304 can then implement an iterative decryption process by using the selected key(s) 322 with the ciphertext tree 332 to derive at least a subset of the message keys 310, which can be used to decrypt at least a subset of the encrypted messages 320.

More specifically, the target device 304 can begin by determining which node in the ciphertext tree 332 corresponds to each of the selected keys 322. The target device 304 can then determine the ciphertext associated with that node, and decrypt that ciphertext using the corresponding selected key 322. The target device 304 may also perform a validation process on the ciphertext using the tag corresponding to the node.

For instance, referring to FIG. 4, if one of the selected keys 322 is the key 408, the target device 304 can determine that the selected key 322 corresponds to node 11, determine that the ciphertext 410 corresponds to node 11, and decrypt the ciphertext 410 using the key 408. Decrypting the ciphertext 410 will produce the child keys for the immediate child nodes of node 11, namely node 9 and node 13. The target device 304 may also perform a validation process using the tag 412. For instance, target device 304 can obtain the child tags (e.g., tag_l, and tag_r) corresponding to child nodes 9 and 13. The target device 304 can then hash the ciphertext 420 and the child tags to generate an expected current tag (Tag expected). The target device 304 can compare the expected current tag to the actual current tag 412. If the two match, then the ciphertext 410 is valid. Otherwise, the ciphertext 410 is invalid. If the target device 304 determines that the ciphertext 410 is invalid, it may skip the rest of the steps and throw an error. This validation process may help ensure that the ciphertext 410 is correct.

Figure 5:
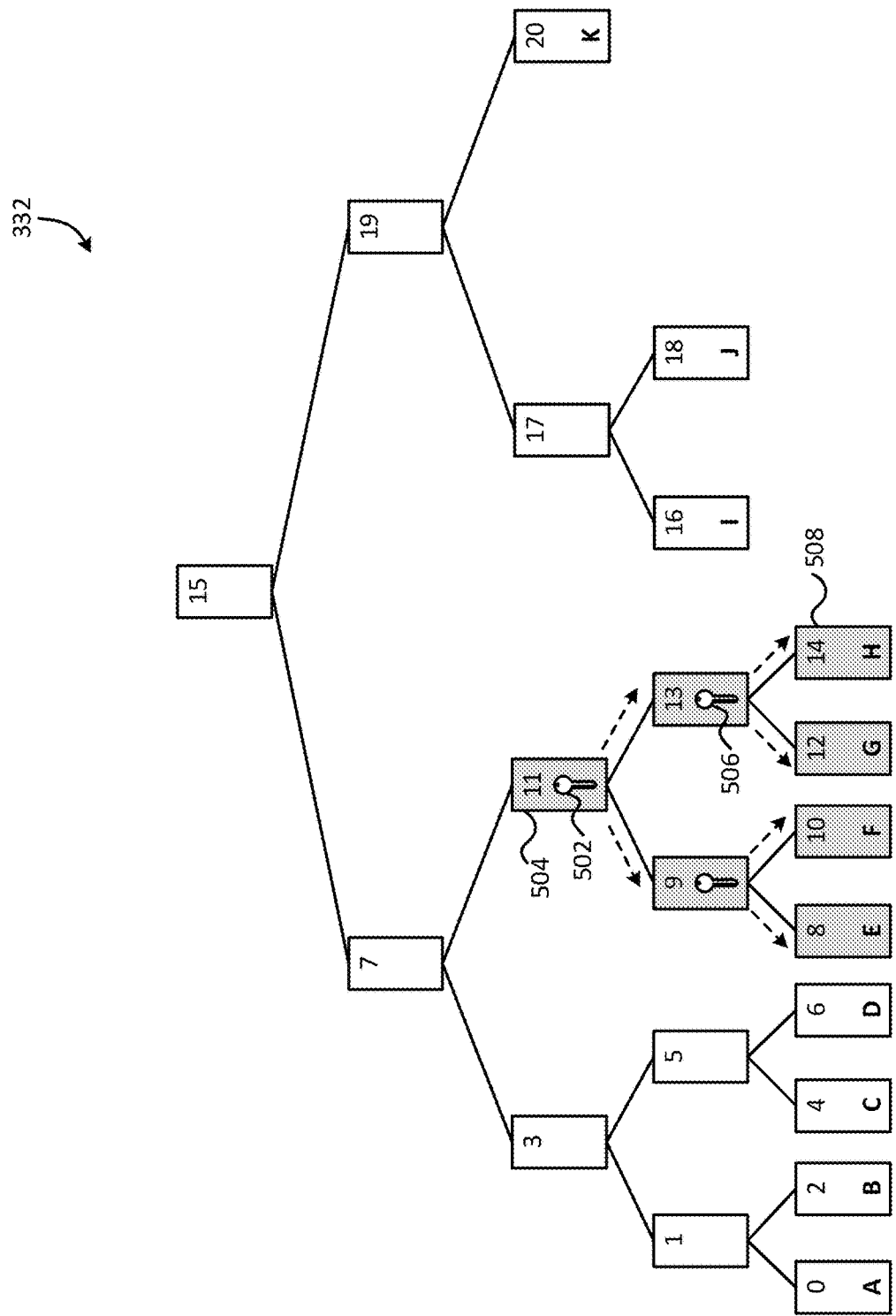
FIG. 5 shows an example of a process for decrypting keys along a pathway of a ciphertext tree according to some aspects of the present disclosure.

A similar process can be applied to decrypt the ciphertexts corresponding to node 9 and node 13, as shown in FIG. 5, to thereby obtain message keys E, F, G, and H. Each of those message keys can be used by the target device 304 to decrypt a corresponding set of the encrypted messages. In this way, as shown in FIG. 5, the target device 302 can traverse one or more pathways (shown in dashed arrows), beginning at a starting node 504 and ending at one or more leaf nodes (e.g., leaf nodes 8, 10, 12, and 14), to obtain one or more message keys for use in decrypting one or more subsets of the encrypted messages 320.

In the iterative process described above, the target device 304 began by identifying a starting node in the ciphertext tree 332 corresponding to a selected key 322. The starting node can correspond to a beginning of a pathway (e.g., branch) through the ciphertext tree 332 to a leaf node. Starting from the starting node, the target device 304 can then sequentially and recursively decrypt each respective ciphertext associated with each respective internal node along the pathway using that node's respective key to derive a child key, where the child key may be used to decrypt the next ciphertext of the next internal node along the pathway, until a leaf node is reached.

Using the above approach, the target device 304 can derive a limited subset 336 of the message keys 310 used to encrypt the messages in the conversation 318. The target device 304 can then decrypt some or all of the encrypted messages 320 using that limited key subset 336, to thereby produce decrypted messages 324. The target device 304 may output some or all of the decrypted messages 324, for example in its chat client software.

In some examples, the target device 304 may not obtain and decrypt all of the encrypted messages 320 at the same time. Rather, the target device 304 may obtain and decrypt messages incrementally as needed. For instance, the chat client software may provide a user interface through which the target user 314 can view messages in the conversation 318. By default, the user interface may only show the most recent messages (e.g., the messages sent in the last 24 hours). But, the user interface may also allow the target user 314 to selectively access older messages. For example, the user interface may have a scrollbar that allows the target user 314 to selectively view older messages. As the target user 314 operates the scrollbar to view older messages, the target device 304 may automatically obtain the corresponding encrypted messages 320 from the server system 306 and decrypt them using a corresponding message key, assuming that the target device 304 has obtained access to the corresponding message key (e.g., by traversing the ciphertext tree 332 using the selected key 322). In this way, older messages may be obtained and decrypted in real time as needed, rather than preemptively, to conserve computing resources.

Figure 6:
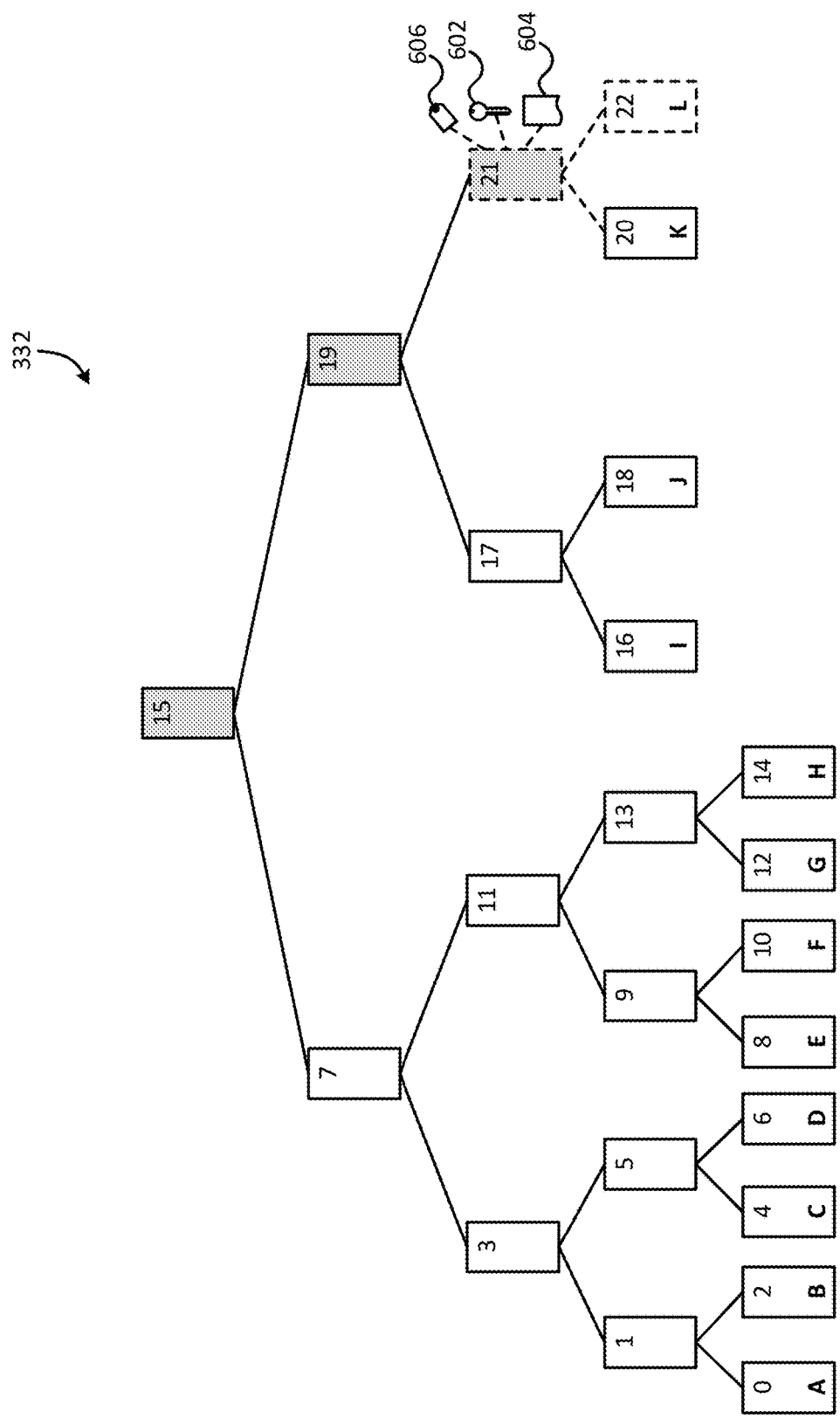
FIG. 6 shows an example of a process for adding a new key to a ciphertext tree according to some aspects of the present disclosure.

As alluded to above, one or more participant devices (e.g., participant device 302) can add new keys and compute new ciphertexts to update the ciphertext tree 332 over time. To update the ciphertext tree 332, the system 300 can implement an iterative update process to update some or all of the nodes going up a corresponding branch of the ciphertext tree 332. One example of this process is shown in FIG. 6 with respect to a new key L. As shown, the system 300 can create a new intermediate node 21 of the ciphertext tree 332. The system 300 can then add two child nodes 20 and 22 to the intermediate node 21. The first child node 20 may have already previously existed as a leaf node in the ciphertext tree 332 and can correspond to the message key (e.g., Message Key K) that was previously assigned to that leaf node 20. The second child node 22 can be a new leaf node that corresponds to the new message key (e.g., Message Key L). Thus, the new leaf node may always be added to the right-most part of the ciphertext tree 332.

Next, the system 300 can generate a derived key 602 for the new intermediate node 21 based on the two child keys. For instance, the system 300 can generate the derived key 602 by hashing the two child keys (e.g., Message Keys K and L). The system 300 can also generate a ciphertext 604 for the new intermediate node 21 using the two child keys and the derived key 602. For instance, the system 300 can generate the ciphertext 604 by encrypting the two child keys using the derived key 602. In some examples, the system 300 may further generate a tag 606 corresponding to the new intermediate node 21.

Because internal node 19 is now complete as a result of adding the new leaf node 22 to the ciphertext tree 332, the system 300 can also generate a derived key and a ciphertext for node 19. For example, the system 300 can use the derived key 602 for node 21 and the derived key for node 17 to generate a derived key and a ciphertext for node 19. The system 300 may further iterate this process up the ciphertext tree 332, for example if other internal nodes are now complete as a result of adding the new leaf node 22 to the ciphertext tree.

It will be appreciated that the number of computations needed to update the ciphertext tree 332 (e.g., to add a new leaf node) is based on the depth of the tree, which in turn is related to the number of nodes in the tree. Because the number of computations required to update the ciphertext tree 332 grows logarithmically with the size of the tree, even if the ciphertext tree 332 is very large, it can still be updated in only a small number of computations. The same is true of obtaining a target key from the ciphertext tree 332. Because the number of computations required to update the ciphertext tree 332 grows logarithmically with the size of the tree, the ciphertext tree 332 can be very large but any arbitrary key can be obtained in only a small number of computations through recursion.

Figure 7:
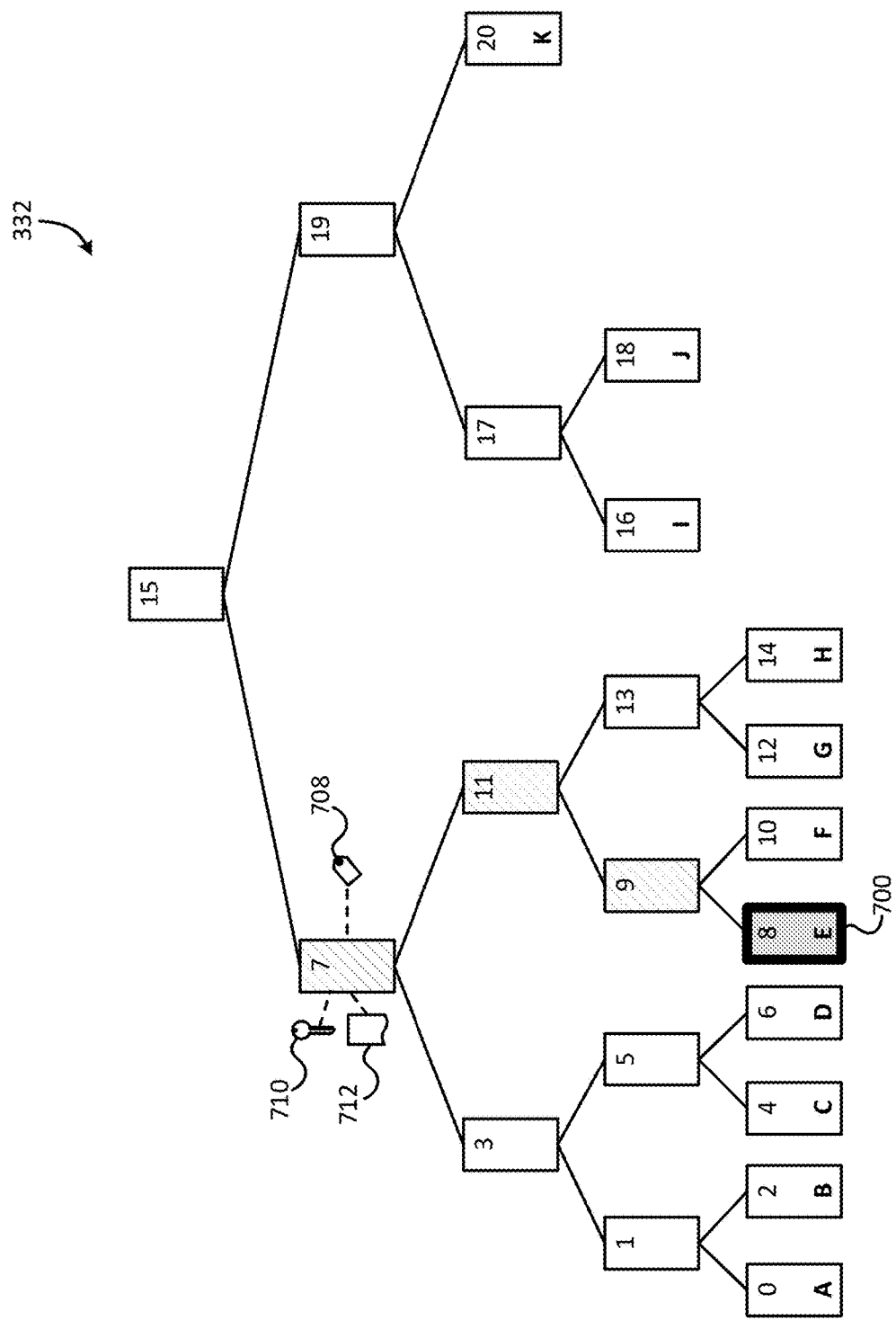
FIG. 7 shows an example of a process for removing an existing key from a ciphertext tree according to some aspects of the present disclosure.

In some cases, it may be desirable for one or more participant devices to delete a certain ciphertext from their memory, as well as any derived keys that could be used to decrypt that ciphertext, either directly or in conjunction with the ciphertext tree 332. This can help ensure that if the participant device were to be compromised by an external attacker, the attacker could not decrypt the ciphertext and obtain access to an encrypted message (which might be sensitive). One example of such a removal process is shown in FIG. 7. In this example, assume that a participant device is storing in its local memory/state the keys corresponding to nodes 7, 17, and 20, which gives the participant device access to recover all message keys A-K. If the participants device wants to prevent recovery of a target message key 700 (e.g., Message Key E), the participant device can identify which of keys 7, 17, and 20 can be used to derive the target message key 700. In this example, the derived key 710 corresponding to node 7 can be used to derive the target message key 700, while the other keys corresponding to nodes 17 and 20 cannot be used to derived the target message key 700. If the participant device is storing multiple derived keys that can be used to derive the target message key 700, the one highest up the ciphertext tree 332 can be chosen. After identifying the derived key 710 usable to derive the target message key 700, the participant device can use the derived key 710 to iteratively recover (e.g., using the techniques described above) the other derived keys corresponding to the siblings of the nodes along the path from node 7 to the target key node 8, and store them in its own local memory/state. In FIG. 7, the path from node 7 to target key node 8 is shown by hatched boxes. The siblings along that path are nodes 10, 13, and 3. Then, the participant device can delete from its local memory the keys on the path from node 7 to the target key node 8—e.g., the keys corresponding to nodes 7, 11, 9, and 8. Thus, at the conclusion of this process, the participant device will store keys 3, 13, 17, and 20, and will be unable to recover target key E in the future.

In some examples, if all of the participant devices remove the same derived key (and any keys corresponding to its direct or indirect parents) from their local memory, then the ciphertext corresponding to that derived key may no longer be decryptable, because none of the participant devices have the necessary key. In that case, the server system 306 might remove the corresponding ciphertext from the ciphertext tree 332, e.g., to save memory. For example, the participant devices may all delete derived key 710 corresponding to node 7. In some such situations, the server system 306 can determine (e.g., by communicating with the participant devices) that all of the participant devices have deleted the derived key 710 and, in response, may delete the corresponding ciphertext 712 and/or tag 708 from memory. This may help conserve memory space on the server system 306 by removing ciphertexts and tags that are no longer capable of decryption. On the other hand, if any of the participant devices still have the derived key 710 corresponding to node 7, then the server system 306 may maintain the corresponding ciphertext 712 and tag 708.

If a ciphertext is removed from the ciphertext tree 332 as discussed above, some nodes in the ciphertext tree will never have a ciphertext, derived key, or tag corresponding to them. This may imply that the root node (e.g., node 15) of the ciphertext tree 332 will never have a key corresponding to it, because (recursively) at least one of its children has no key associated with it. This may also imply that not all complete internal nodes will have ciphertexts associated with them. The participant devices can account for these factors when updating the ciphertext tree 332.

Figure 8:
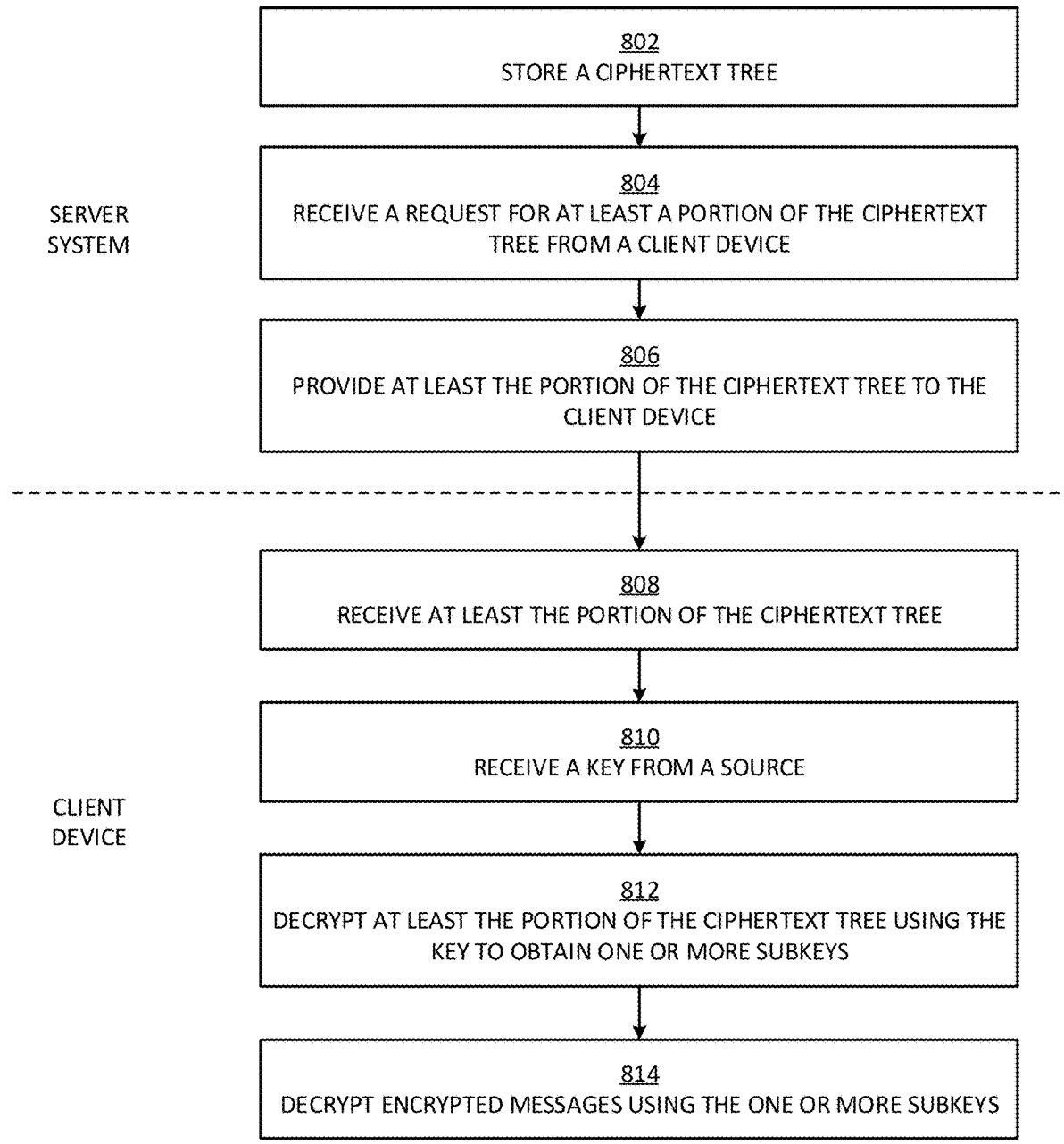
FIG. 8 shows a flowchart of an example of a process for granting selective access to an encrypted conversation history according to some aspects of the present disclosure.

Turning now to FIG. 8, shown is a flowchart of an example of a process for granting selective access to an encrypted conversation history according to some aspects of the present disclosure. Other examples may involve more operations, fewer operations, different operations, or a different sequence of operations than is shown in FIG. 8. The operations of FIG. 8 are described below with reference to the components of FIG. 3 above.

In block 802, a server system 306 stores a ciphertext tree 332. In some examples, the server system 306 can be internal or external to a chat service provider that facilitates a conversation 318 between participants. The ciphertext tree 332 can include one or more internal nodes (e.g., a root node and/or a non-root internal node). Each internal node can each have one or more child nodes. And each complete internal node can correspond to a derived key and a ciphertext. The ciphertext can be generated by encrypting child keys using the derived key, where the child keys correspond to child nodes (e.g., the direct child notes) of the internal node. In some examples, the child keys may have previously been used to encrypt messages associated with the conversation 318.

In block 804, the server system 306 receives a request (e.g., request 326) from a client device, such as target device 304, associated with a user, such as the target user 314. The request can be for at least a portion of the ciphertext tree 332. If the client device only needs a portion of the ciphertext tree 332 to decrypt a target subset of the encrypted messages 320 (e.g., a particular branch or sub-branch), then the request may indicate the portion that is needed.

In block 806, the server system 306 provides at least the portion of the ciphertext tree 332 to the client device. For example, the server system 306 can determine that the client device has been granted access to a specific portion of the ciphertext tree 332 (e.g., by another user such as the participant 312), and provide only that portion of the ciphertext tree 332 to the client device. The portion can be a specific branch of the ciphertext tree 332 that includes the nodes that are capable of being decrypted using a selected key 322 to which the target device 304 has been granted access.

In block 808, the client device receives at least the portion of the ciphertext tree 332. For example, the client device can receive the portion of the ciphertext tree 332 from the server system 306 via one or more networks 308.

In block 810, the client device receives a key from a source. The key may be a selected key 322 (e.g., a derived key) chosen by an entity, such as the participant 312 or another individual, to control how much of the conversation history is accessible to the client device. The source may be any suitable entity that has access to the key. For example, the source can be the server system 306, a participant device 302 of a participant 312 in the conversation 318, or a client device of a user that did not participate in the conversation 318 but nevertheless has access to the key. In some examples in which a participant device 302 is the source, the participant device 302 may be the same participant device that generated the message keys 310 used to create the ciphertext tree 332.

In block 812, the client device decrypts at least the portion of the ciphertext tree 332 using the key to obtain one or more subkeys. For example, the client device can decrypt a branch of the ciphertext tree 332 using the key by identifying a starting node associated with the key, decrypting a ciphertext associated with the starting node using the key to obtain a pair of child keys, and then repeating this process down the branch to obtain some or all of the subkeys in the branch. A subkey is a key associated with a direct or indirect child of the starting node. The subkeys corresponding to leaf nodes may have been directly used to encrypt messages in the conversation 318. And the subkeys corresponding to internal nodes may be derived keys that were generated based on the child keys and, thus, may not have been used to encrypt messages in the conversation 318.

In block 814, the client device decrypts some or all of the encrypted messages 320 using the one or more subkeys, to thereby generate decrypted messages 324. For example, the client device can decrypt a first subset of the encrypted messages 320 using a first subkey corresponding to a first leaf node in the ciphertext tree 332. The client device may also decrypt a second subset of the encrypted messages 320 using a second subkey corresponding to a second leaf node in the ciphertext tree 332.

Figure 9:
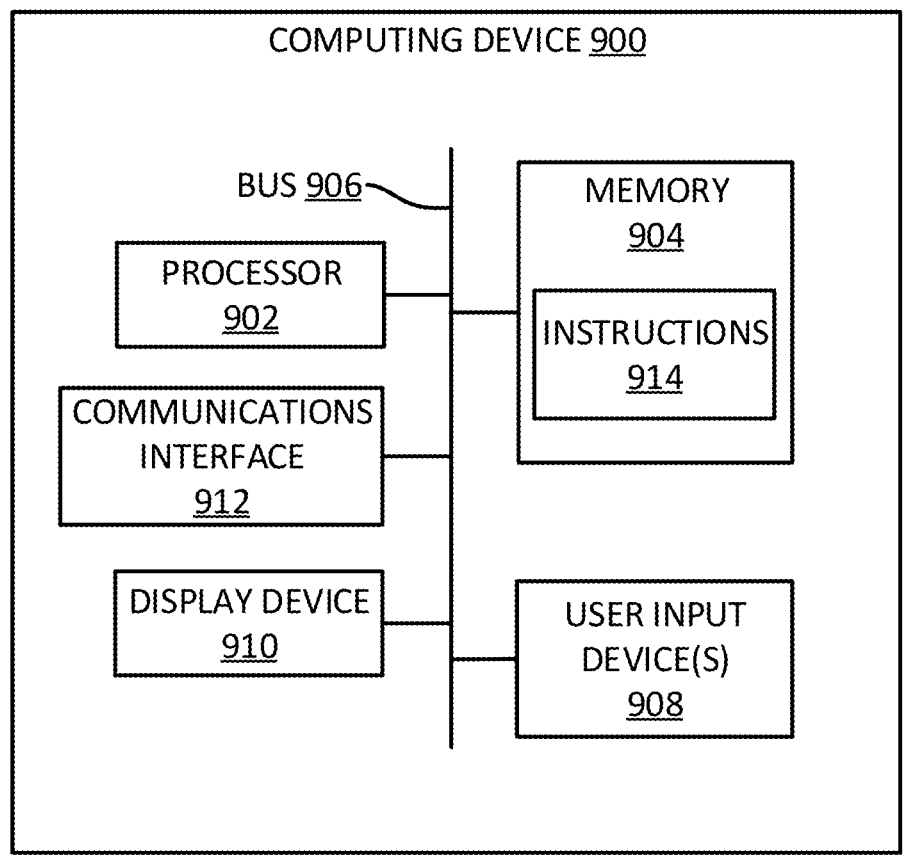
FIG. 9 shows a block diagram of an example of a computing device usable to implement some aspects of the present disclosure.

Turning now to FIG. 9, shown is a block diagram of an example of a computing device 900 usable to implement some aspects of the present disclosure. In some examples, the computing device 900 may correspond to any of the client devices, server systems, or videoconference providers described above.

The computing device 900 includes a processor 902 that is in communication with the memory 904 and other components of the computing device 900 using one or more communications buses 906. The processor 902 is configured to execute processor-executable instructions 914 stored in the memory 904 to perform one or more processes described herein.

As shown, the computing device 900 also includes one or more user input devices 908 (e.g., a keyboard, mouse, touchscreen, video capture device, and/or microphone) to accept user input and the display device 910 to provide visual output to a user. The computing device 900 further includes a communications interface 912. In some examples, the communications interface 912 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a videoconferencing server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

Certain aspects and features can be implemented according to one or more of the following examples. As used below, any reference to a series of examples is to be understood as reference to each of those examples disjunctively (E.g., "Examples 1-4" is to be understood as Examples 1, 2, 3, or 4").

Example #1: A method comprising: accessing, by one or more processors, a ciphertext tree that includes an internal node with a plurality of child nodes, wherein the internal node corresponds to a key and a ciphertext, the ciphertext being generated by encrypting a plurality of child keys corresponding to the plurality of child nodes using the key, wherein the plurality of child keys were used to encrypt messages associated with a conversation; and providing, by the one or more processors, the ciphertext to a client device, the client device being configured to: receive the key from a source; decrypt the ciphertext using the key to derive the plurality of child keys corresponding to the plurality of child nodes; and decrypt at least some of the encrypted messages using at least one key of the plurality of child keys.

Example #2: The method of Example #1, wherein the ciphertext tree is a binary tree in which each node has no more than two child nodes.

Example #3: The method of any of Examples #1-2, wherein the ciphertext tree includes a plurality of internal nodes each having a set of child nodes, each respective internal node of the plurality of internal nodes being associated with a respective key and a respective ciphertext, the respective key being generated based on a set of child keys corresponding to the set of child nodes, and the respective ciphertext being generated by encrypting the set of child keys using the respective key.

Example #4: The method of Example #3, further comprising: providing, by the one or more processors, at least a portion of the ciphertext tree to the client device, the client device being configured to: identify a starting node in the ciphertext tree, the starting node corresponding to a beginning of a pathway through the ciphertext tree to a target node associated with a target key, the target key being usable to decrypt a target set of messages among the encrypted messages; and starting from the starting node, sequentially decrypt each respective ciphertext associated with each respective internal node along the pathway using its respective key to derive a child key.

Example #5: The method of Example #3, wherein the ciphertext tree includes a plurality of leaf nodes, the plurality of leaf nodes having corresponding keys used to encrypt the encrypted messages, and the plurality of leaf nodes not having corresponding ciphertexts in the ciphertext tree.

Example #6: The method of any of Examples #1-5, further comprising adding a new node associated with a new key to the ciphertext tree.

Example #7: The method of any of Examples #1-6, wherein the client device is a first client device, the source is a second client device associated with a participant in the conversation, and the second client device generated the plurality of child keys and the ciphertext.

Example #8: The method of Example #7, wherein the second client device further generated the key by hashing the plurality of child keys, and wherein the second client device generated the plurality of child keys independently of the key for use in encrypting messages associated with the conversation.

Example #9: A system comprising: one or more processors; and one or more memories including instructions that are executable by the one or more processors to cause the one or more processors to perform operations comprising: accessing a ciphertext tree that includes an internal node with a plurality of child nodes, wherein the internal node corresponds to a key and a ciphertext, the ciphertext being generated by encrypting a plurality of child keys corresponding to the plurality of child nodes using the key, wherein the plurality of child keys were used to encrypt messages associated with a conversation; and providing the ciphertext to a client device, the client device being configured to: receive the key from a source; decrypt the ciphertext using the key to derive the plurality of child keys corresponding to the plurality of child nodes; and decrypt at least some of the encrypted messages using at least one key of the plurality of child keys.

Example #10: The system of Example #9, wherein the ciphertext tree is a binary tree in which each node has no more than two child nodes.

Example #11: The system of any of Examples #9-10, wherein the ciphertext tree includes a plurality of internal nodes each having a set of child nodes, each respective internal node of the plurality of internal nodes being associated with a respective key and a respective ciphertext, the respective key being generated based on a set of child keys corresponding to the set of child nodes, and the respective ciphertext being generated by encrypting the set of child keys using the respective key.

Example #12: The system of Example #11, wherein the operations further comprise providing at least a portion of the ciphertext tree to the client device, the client device being configured to: identify a starting node in the ciphertext tree, the starting node corresponding to a beginning of a pathway through the ciphertext tree to a target node associated with a target key, the target key being usable to decrypt a target set of messages among the encrypted messages; and starting from the starting node, sequentially decrypt each respective ciphertext associated with each respective internal node along the pathway using its respective key to derive a child key.

Example #13: The system of any of Examples #9-12, wherein the ciphertext tree includes a plurality of leaf nodes, the plurality of leaf nodes having corresponding keys used to encrypt the encrypted messages, and the plurality of leaf nodes not having corresponding ciphertexts in the ciphertext tree.

Example #14: The system of any of Examples #9-13, wherein the operations further comprise removing an existing node associated with an existing key from the ciphertext tree.

Example #15: The system of any of Examples #9-14, wherein the client device is a first client device, the source is a second client device associated with a participant in the conversation, and the second client device is configured to generate the plurality of child keys and the ciphertext.

Example #16: The system of any of Examples #9-15, wherein the client device is a first client device, the source is a second client device associated with a participant in the conversation, and wherein the second client device is configured to: generate the plurality of child keys independently of the key, for use in encrypting messages associated with the conversation; and generate the key by hashing the plurality of child keys.

Example #17: A non-transitory computer-readable medium comprising program code that is executable by one or more processors to cause the one or more processors to perform operations comprising: accessing a ciphertext tree that includes an internal node with a plurality of child nodes, wherein the internal node corresponds to a key and a ciphertext, the ciphertext being generated by encrypting a plurality of child keys corresponding to the plurality of child nodes using the key, wherein the plurality of child keys were used to encrypt messages associated with a conversation; and providing the ciphertext to a client device, the client device being configured to: receive the key from a source; decrypt the ciphertext using the key to derive the plurality of child keys corresponding to the plurality of child nodes; and decrypt at least some of the encrypted messages using at least one key of the plurality of child keys.

Example #18: The non-transitory computer-readable medium of Example #17, wherein the ciphertext tree includes: a plurality of internal nodes each having a set of child nodes, each respective internal node of the plurality of internal nodes being associated with a respective key and a respective ciphertext, the respective key being generated based on a set of child keys corresponding to the set of child nodes, and the respective ciphertext being generated by encrypting the set of child keys using the respective key; and a plurality of leaf nodes, the plurality of leaf nodes having corresponding keys used to encrypt the encrypted messages, and the plurality of leaf nodes not having corresponding ciphertexts in the ciphertext tree.

Example #19: The non-transitory computer-readable medium of any of Examples #17-18, wherein the operations further comprise providing at least a portion of the ciphertext tree to the client device, the client device being configured to: identify a starting node in the ciphertext tree, the starting node corresponding to a beginning of a pathway through the ciphertext tree to a target node associated with a target key, the target key being usable to decrypt a target set of messages among the encrypted messages; and starting from the starting node, sequentially decrypt each respective ciphertext associated with each respective internal node along the pathway using its respective key to derive a child key.

Example #20: The non-transitory computer-readable medium of any of Examples #17-19, wherein the client device is further configured to: obtain a tag corresponding to the ciphertext; validate the ciphertext using the tag; and based on determining that the ciphertext is valid, decrypt the ciphertext using the key.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations thereof in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The invention claimed is:

1. A method comprising:
   accessing, by one or more processors, a stored ciphertext tree that includes:
   a root node;
   leaf nodes corresponding to encryption keys used to encrypt messages associated with a conversation to produce encrypted messages; and
   an internal node located between the root node and the leaf nodes, wherein the internal node has a set of child nodes in the stored ciphertext tree, and wherein the internal node is associated with a key and a ciphertext, the key being generated based on a set of child keys corresponding to the set of child nodes, and the ciphertext being generated by encrypting the set of child keys using the key; and
   providing, by the one or more processors, a particular ciphertext for a selected node in the stored ciphertext tree to a client device, the selected node corresponding to a branch of the stored ciphertext tree that includes a selected subset of the encrypted messages to be decrypted, the client device being configured to:
   receive a particular key corresponding to the selected node from a source;
   decrypt the particular ciphertext using the particular key to derive a plurality of child keys corresponding to a plurality of child nodes of the selected node in the stored ciphertext tree; and
   decrypt at least some of the selected subset of the encrypted messages based on the plurality of child keys.

2. The method of claim 1, wherein the stored ciphertext tree is a binary tree in which each node has no more than two child nodes.

3. The method of claim 1, further comprising:
   providing, by the one or more processors, at least a portion of the stored ciphertext tree to the client device, the client device being configured to:
   identify the selected node as a starting node in the stored ciphertext tree, the starting node corresponding to a beginning of a pathway through the stored ciphertext tree to a target node associated with a target key, the target key being usable to decrypt a target set of messages among the encrypted messages; and
   starting from the starting node, sequentially decrypt each respective ciphertext associated with each respective internal node along the pathway using its respective key to derive a child key.

4. The method of claim 1, wherein the leaf nodes do not have corresponding ciphertexts in the stored ciphertext tree.

5. The method of claim 1, further comprising adding a new node associated with a new key to the stored ciphertext tree.

6. The method of claim 1, wherein the client device is a first client device, the source is a second client device associated with a participant in the conversation, and the second client device generated the plurality of child keys and the particular ciphertext.

7. The method of claim 6, wherein the second client device further generated the particular key by hashing the plurality of child keys, and wherein the second client device generated the plurality of child keys independently of the particular key for use in encrypting messages associated with the conversation.

8. A system comprising:
   one or more processors; and
   one or more memories including instructions that are executable by the one or more processors to cause the one or more processors to perform operations comprising:
   accessing a stored ciphertext tree that includes:
   a root node;
   leaf nodes corresponding to encryption keys used to encrypt messages associated with a conversation to produce encrypted messages; and
   an internal node located between the root node and the leaf nodes, wherein the internal node has a set of child nodes in the stored ciphertext tree, and wherein the internal node is associated with a key and a ciphertext, the key being generated based on a set of child keys corresponding to the set of child nodes, and the ciphertext being generated by encrypting the set of child keys using the key; and
   providing a particular ciphertext for a selected node in the stored ciphertext tree to a client device, the selected node corresponding to a branch of the stored ciphertext tree that includes a selected subset of the encrypted messages to be decrypted, the client device being configured to:
   receive a particular key corresponding to the selected node from a source;
   decrypt the particular ciphertext using the particular key to derive a plurality of child keys corresponding to a plurality of child nodes of the selected node in the stored ciphertext tree; and
   decrypt at least some of the selected subset of the encrypted messages based on the plurality of child keys.

9. The system of claim 8, wherein the stored ciphertext tree is a binary tree in which each node has no more than two child nodes.

10. The system of claim 8, wherein the operations further comprise providing at least a portion of the stored ciphertext tree to the client device, the client device being configured to:
   identify the selected node as a starting node in the stored ciphertext tree, the starting node corresponding to a beginning of a pathway through the stored ciphertext tree to a target node associated with a target key, the target key being usable to decrypt a target set of messages among the encrypted messages; and starting from the starting node, sequentially decrypt each respective ciphertext associated with each respective internal node along the pathway using its respective key to derive a child key.

11. The system of claim 8, wherein the leaf nodes do not have corresponding ciphertexts in the stored ciphertext tree.

12. The system of claim 8, wherein the operations further comprise removing an existing node associated with an existing key from the stored ciphertext tree.

13. The system of claim 8, wherein the client device is a first client device, the source is a second client device associated with a participant in the conversation, and the second client device is configured to generate the plurality of child keys and the particular ciphertext.

14. The system of claim 8, wherein the client device is a first client device, the source is a second client device associated with a participant in the conversation, and wherein the second client device is configured to:
generate the plurality of child keys independently of the particular key, for use in encrypting the messages associated with the conversation; and
generate the particular key by hashing the plurality of child keys.

15. A non-transitory computer-readable medium comprising program code that is executable by one or more processors to cause the one or more processors to perform operations comprising:
accessing a stored ciphertext tree that includes:
a root node;
leaf nodes corresponding to encryption keys used to encrypt messages associated with a conversation to produce encrypted messages; and
an internal node located between the root node and the leaf nodes, wherein the internal node has a set of child nodes in the stored ciphertext tree, and wherein the internal node is associated with a key and a ciphertext, the key being generated based on a set of child keys corresponding to the set of child nodes, and the ciphertext being generated by encrypting the set of child keys using the respective key; and providing a particular ciphertext for a selected node in the stored ciphertext tree to a client device, the selected node corresponding to a branch of the stored ciphertext tree that includes a selected subset of the encrypted messages to be decrypted, the client device being configured to:
receive a particular key corresponding to the selected node from a source;
decrypt the particular ciphertext using the particular key to derive a plurality of child keys corresponding to a plurality of child nodes of the selected node in the stored ciphertext tree; and
decrypt at least some of the selected subset of the encrypted messages based on the plurality of child keys.

16. The non-transitory computer-readable medium of claim 15, wherein the leaf nodes do not have corresponding ciphertexts in the stored ciphertext tree.

17. The non-transitory computer-readable medium of claim 15, wherein the operations further comprise providing at least a portion of the stored ciphertext tree to the client device, the client device being configured to:
identify the selected node as a starting node in the stored ciphertext tree, the starting node corresponding to a beginning of a pathway through the stored ciphertext tree to a target node associated with a target key, the target key being usable to decrypt a target set of messages among the encrypted messages; and
starting from the starting node, sequentially decrypt each respective ciphertext associated with each respective internal node along the pathway using its respective key to derive a child key.

18. The non-transitory computer-readable medium of claim 15, wherein the client device is further configured to:
obtain a tag corresponding to the particular ciphertext;
validate the particular ciphertext using the tag; and
based on determining that the particular ciphertext is valid, decrypt the particular ciphertext using the particular key.

* * * * *